United States Patent
Schurecht et al.

(10) Patent No.: US 6,260,157 B1
(45) Date of Patent: Jul. 10, 2001

(54) PATCHING OF A READ ONLY MEMORY

(76) Inventors: Kurt Schurecht, 617 N. Fifth Ave., St. Charles, IL (US) 60174; Steven W. Bennett, 24030 N. Lakeside, Lake Zurich, IL (US) 60047; James L. Porter, 520 Willow Rd., Wauconda, IL (US) 60084

( * ) Notice: Subject to any disclaimer, the term of this patent is extended or adjusted under 35 U.S.C. 154(b) by 0 days.

(21) Appl. No.: 09/250,888

(22) Filed: Feb. 16, 1999

(51) Int. Cl.[7] ...................................................... G06F 9/26
(52) U.S. Cl. ................................. 714/8; 711/202; 714/7
(58) Field of Search ......................... 712/200, 32; 717/4; 714/5, 38, 8, 7; 711/108, 5, 202; 713/3

(56) References Cited

U.S. PATENT DOCUMENTS

| | | | |
|---|---|---|---|
| 4,028,678 | 6/1977 | Moran | 340/172.5 |
| 4,400,798 | 8/1983 | Francis et al. | 365/174 |
| 4,542,453 | 9/1985 | Patrick et al. | 364/200 |
| 4,751,703 | 6/1988 | Picon et al. | 371/10 |
| 4,802,119 | 1/1989 | Heene et al. | 364/900 |
| 4,831,517 * | 5/1989 | Crouse et al. | 714/8 |
| 5,212,693 * | 5/1993 | Chao et al. | 714/5 |
| 5,493,674 | 2/1996 | Mizutani et al. | 395/182.04 |
| 5,546,586 * | 8/1996 | Wetmore et al. | 395/705 |
| 5,726,641 | 3/1998 | Ide | 340/825.22 |
| 5,757,690 * | 5/1998 | McMahon | 365/104 |
| 5,796,972 | 8/1998 | Johnson et al. | 395/384 |
| 5,802,549 | 9/1998 | Goyal et al. | 711/102 |
| 5,829,012 * | 10/1998 | Marlan et al. | 711/102 |

FOREIGN PATENT DOCUMENTS

| | | |
|---|---|---|
| 0 049 353 A1 | 4/1982 | (EP) . |
| 5-73292 | 3/1993 | (JP) . |
| WO 98/57255 | 12/1998 | (WO) . |

OTHER PUBLICATIONS

Bradley et al., "Method of Customizing Patches for Each Hardware Configuration," *IBM Technical Disclosure Bulletin*, vol. 27, No. 4A, pp. 2187–88, Sep. 1984.

"Maintainable ROS Code Through the Combination of ROM and EEPROM," *IBM Technical Disclosure Bulletin*, vol. 32, No. 9A, pp. 273–76, Feb. 1990.

"Optimized Use of Code Patch Storage," *IBM Technical Disclosure Bulletin*, vol. 36, No. 5, pp. 469–70, pp. 469–70, May 1993.

Stevens, J. "DSPs in Communications," http://www.Spectrum.ieee.org/Spectrum/Sep. 98/features/dsp.html, 1998

* cited by examiner

*Primary Examiner*—Larry D. Donaghue
(74) *Attorney, Agent, or Firm*—Marshall, O'Toole, Gerstein, Murray & Borun

(57) ABSTRACT

A processing device includes a ROM having program instructions and at leas one jump instruction stored therein, a patch program for patching the program instructions in the ROM, a RAM capable of storing the patch program and a patch vector table that indicates the location of the patch program. A processor executes the program instructions in the program ROM and uses the patch vector table to execute the patch program when one of the jump instructions is reached. The patch program may be stored in the RAM and the patch vector table may point to the address in the RAM at which the patch program is stored so that the processor jumps directly to the RAM to execute the patch program when it reaches the one of the jump instructions. Likewise, a patch engine may be used to locate a specified patch program, load the specified patch program into the RAM and execute the specified patch program when the processor reaches the one of the jump instructions.

42 Claims, 4 Drawing Sheets

PATCHING OF A READ ONLY MEMORY

TECHNICAL FIELD

The present invention relates generally to logic-type processing devices and, more particularly, to the patching of program instructions stored in a read only memory (ROM) associated with a logic-type processing device.

BACKGROUND ART

Logic-type processing devices, like microcontrollers, generally include a processor, such as a microprocessor, and one or more memories that store programs for execution by the processor. During operation, the processor sequentially executes instructions associated with any one of the programs to, for example, manipulate data, perform calculations, generate various output signals, or otherwise interact with hardware components to perform some predetermined function.

The memories used by processing devices are either read only memories (ROMs), which can be read by the processor but to which the processor cannot write, or random access memories (RAMs), which can be read by the processor and to which the processor can write. While RAMs are more versatile in that they can be easily reprogrammed, RAMs typically have a much larger footprint than ROMs and are more expensive than ROMs. Furthermore, many RAMs are volatile, which means that they must be refreshed on a periodic basis to prevent loss of the information stored therein. As a result, these RAMs are not suitable for storing information, such as programs, which must be retained upon powering-down of the processing device or upon a loss of power to the processing device. For these reasons, ROMs are typically used to store programs that are central or essential to the operation of the logic device.

ROMs can generally be characterized as being erasable or non-erasable. One type of erasable ROM is the erasable programmable read only memory (EPROM) which may be, for example, an electrically-erasable programmable read only memory (EEPROM), an ultraviolet erasable programmable read only memory (UV-EPROM), a flash memory and the like. Non-erasable ROMs, such as masked ROMs or ROMs used in one-time-programmable (OTP) microcontrollers, are either manufactured with the program instructions or data stored therein or are capable of being programmed only once. While erasable ROMs are more versatile than non-erasable ROMs, erasable ROMs are usually much more expensive than non-erasable ROMs.

Due to their versatility, erasable ROMs are typically used during the development of consumer products, such as cellular telephones, having processing devices therein, while the cheaper non-erasable ROMs are used in the final, mass produced product to reduce the cost of the product. In a typical case, a prototype product is provided with a processor and an erasable ROM. A product designer uses a personal computer or workstation to write code for the processing device and, when he or she is satisfied with the code, downloads the code to a device programmer. The device programmer then transfers the code to the erasable ROM, such as an EEPROM, which is then placed within the prototype product. Thereafter, testing of the code within the prototype product is performed and, if necessary, the erasable ROM is erased and reprogrammed multiple times during the development process. When testing is complete, the consumer product is mass produced using non-erasable ROMs having the final version of the designed code burned or otherwise stored therein.

Generally speaking, the mass-produced version of a consumer product, such as a cellular telephone handset, includes one or more application specific integrated circuits (ASICs) or masked microcontrollers therein. ASICs are produced from specifications supplied by a purchaser, and typically have various components like processors, which may be, for example, digital signal processors, RAMs, ROMs and the like formed together in on single integrated circuit. As indicated above, the code used by the processor of the ASIC is typically stored in a masked ROM and, therefore, cannot be changed once the ASIC is manufactured. While there is a significant tooling charge (which may be tens or hundreds of thousands of dollars) associated with the production of an ASIC, the per unit cost of each component can still be very low when high volume production of the ASIC component is needed.

A major drawback associated with the use of an ASIC, a masked microcontroller or any other logic device that stores code in a non-erasable memory is the fact that the code is "hard wired" (not changeable) and thus, must be set at the time the logic device is produced. Because the tooling costs for ASICs are very high, it is undesirable to change the code within the ASIC after production of the ASIC has begun. Accordingly, many hours are typically spent testing code before a logic device that uses a non-erasable memory device to store that code is ordered. However, extensive testing can delay the release of a product using the logic device. Thus, the decision to release code for use in an ASIC comes down to a tradeoff between providing enough time to test the code and getting the ultimate product to market as soon as possible.

Once code is approved and released for use in a product, errors or "bugs" may be found in the released code. In some instances, while no "bugs" may be present within the code, it may be desirable to change some of the parameters of the code or to enhance the operation of the code in some manner. Of course, the decision to correct, optimize, add features or refine the code will result in the need to alter the code. However, making changes in the code within a product that is already released for manufacture requires replacing the non-erasable memories that store the code which, in turn, generates new tooling costs for the manufacture of new ASICs. This activity also delays final release or increases the cost of the product. Furthermore, if changes in the code are needed after the product has been placed on the market, the products which have already been sold may have to be recalled to have the ASICs therein replaced, which can be expensive.

Methods of patching ROM code have been developed to reduce or eliminate the need to replace ROMs within ASICs or other devices. Patching methods disclosed in, for example, Patrick et al., U.S. Pat. No. 4,542,453, Moran, U.S. Pat. No. 4,028,678 and Heene et al., U.S. Pat. No. 4,802,119 detect the ROM address being read by a processor and, if a patch instruction is provided for that ROM address, disable the ROM and enable a patch memory, which then provides a patch instruction for the generated ROM address. Unfortunately, these methods require complex addressing detection and ROM interruption schemes, which necessitate a significant amount of additional hardware. Other patching methods, such as those disclosed in Mizutani et al., U.S. Pat. No. 5,493,674 and EPO document 0 049 353 A1 provide one or more jump instructions within the ROM to be patched and configure each of the jump instructions to cause a jump to a specified location within a patch memory, such as an EPROM. If no patch is to be performed, the patch memory includes a jump instruction back to the ROM. If, however, a patch is to be performed, the patch memory includes a patch program which is executed before jumping back to the ROM. The patching methods disclosed in these documents, however, require an actual jump to the patch memory even when no patch is to be performed and, thus, use at least two jump instructions cycles at each jump location. Furthermore, because these methods cause jumps to predetermined and unchangeable locations within a patch memory, they limit the size of the patch program that can be performed at any particular jump location or otherwise use the patch memory inefficiently.

SUMMARY OF THE INVENTION

A processing device having a ROM capable of being patched includes a ROM that stores program instructions and at least one jump instruction, a patch program, a RAM memory capable of storing the patch program, and a patch vector table that indicates the location of the patch program. A processor executes the program instructions in the program ROM and uses the patch vector table to execute the patch program when the processor reaches one of the jump instructions. If desired, the patch program may be initially stored in the RAM and the patch vector table may point to the address in the RAM at which the patch program is stored. In this case, the processor jumps directly to the RAM to execute the patch program when it reaches a jump instruction at which a patch is to be performed. However, if no patch program is to be executed at a jump, the patch vector table points to an address within the ROM which causes the processor to jump directly to another address within the ROM without jumping into the RAM.

Alternatively, one or more patch engine calls may be stored in the RAM. Each of the patch engine calls preferably specifies a particular patch program to be executed and calls a patch engine. The patch engine locates the specified patch program, loads the specified patch program into the RAM and executes the specified patch program. If desired, the patch engine may use a patch engine data table to identify and locate a patch program for execution. In one embodiment, the patch engine data table specifies a patch program to be executed based on an address associated with the patch engine call. For each patch program, the patch engine data table stores a patch program identifier, a patch program address, a patch program length and a return address. The patch program address indicates the location of the specified patch program to be executed, the patch program length indicates the length of the specified patch program to be executed, and the return address specifies where the processor is to return after executing the specified patch program.

DESCRIPTION OF THE PREFERRED EMBODIMENT

Figure 1:
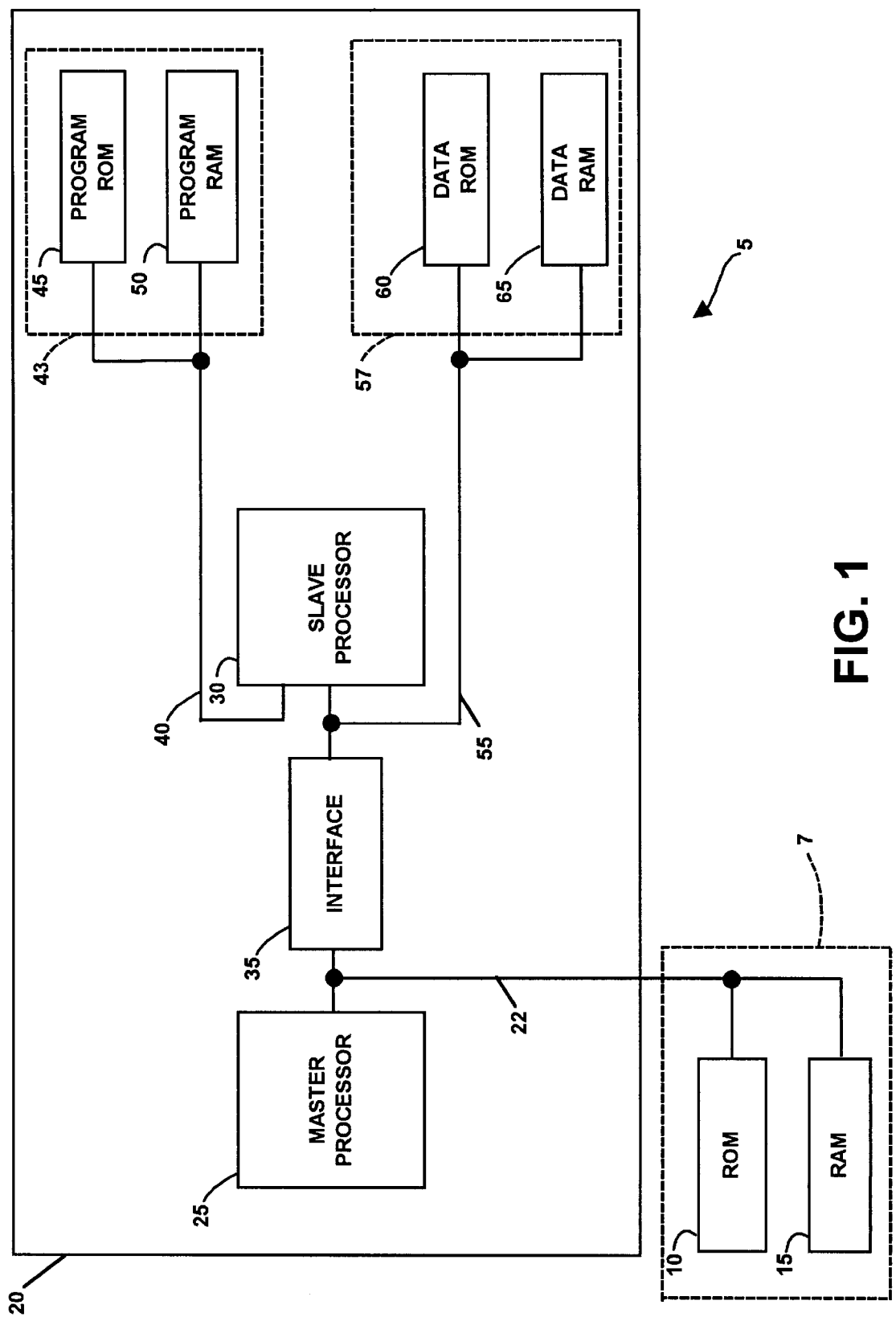
FIG. 1 is a block diagram of a processing device having ROM patching capabilities.

Referring now to FIG. 1, a processing device 5 which may be, for example, a logic device used in a cellular telephone handset or the like, generally includes an external memory 7 having an external ROM 10 and an external RAM 15 in communication with an ASIC 20 via a bus 22. As is typical in digital cellular telephone handset technology, the ASIC 20 includes a master processor 25 and a slave processor 30 connected to one another via an interface 35. A program bus 40 connects the slave processor 30 to a program memory 43 having a program ROM 45 and a program RAM 50. The program ROM 45 and the program RAM 50 store program code for implementation by the slave processor 30. Likewise, a data bus 55 connects the slave processor 30 to a data memory 57 having a data ROM 60 and a data RAM 65. The data ROM 60 and the data RAM 65 store data used by the slave processor 30 during operation.

As will be understood, the ASIC 20 is manufactured having program code burned or otherwise stored in the program ROM 45 in a non-erasable manner and has data burned or otherwise stored in the data ROM 60 in a non-erasable manner. The ROM 10 of the external memory 7 may be any desired type of ROM including erasable ROM, such as an EEPROM or a flash memory device, or non-erasable ROM. Furthermore, because it is desirable to provide the ASIC 20 with as small of a footprint as possible, and because RAMs are relatively expensive, the program RAM 50 on the ASIC 20 is much smaller than the external RAM 15 and the external ROM 10. In a preferred embodiment, the amount of program RAM 50 used in the ASIC 20 is approximately one-eighth to one-sixth of the amount of external RAM 15 and, in one embodiment, the program RAM 50 is approximately 32K bytes in size.

The master processor 25 and the slave processor 30 may be conventional microprocessors or digital signal processors (DSPs) or any other desired types of processors. In cellular telephone handset applications, for example, the master processor 25 may be a conventional microprocessor that is used to control various aspects of the telephone such as reading key presses, controlling the mode of the phone, and controlling a user display such as a light-emitting diode display or liquid crystal display. The slave processor 30 may be a DSP used to execute code that, for example, performs signal processing or other functions related to the different modes of operation of the telephone.

In conventional operation, the slave processor 30 retrieves program instructions or code from the program ROM 45 and executes the code instructions sequentially. As will be appreciated by those skilled in the art, code instructions may take various forms including jumps, calls, loads, etc. To enable patching of the program instructions within the ROM 45, one or more jump instructions are coded at convenient places within the ROM code. These jump instructions may, for example, be placed at every nth location within the code (where n is any integer), at the end or beginning of any subroutine, where jump instructions are already located within the code or at any other desired or logical location. Generally speaking, a patch may be performed at any or all of these jump instructions. Furthermore, to enable patching of the ROM code, a patch vector table is stored within the processing device 5 and is used by the jump instructions to identify where to jump or what patch program, if any, to implement at the jump instruction.

The patch vector table may be stored in the external ROM 10 or the external RAM 15 and, if desired, may be transferred to the data RAM 65 of the ASIC 20 when patching is to be performed. However, the patch vector table may be stored at any other desired location within the processing device 5, such as in the program RAM 50, as long as the patch vector table is accessible by the slave processor 30.

In a first embodiment, the patch vector table includes a patch vector for each of the jump instructions within the program ROM 45. A patch vector for any particular jump instruction specifies or points to another address in the program ROM 45 when no patch is to be performed at the particular jump instruction and specifies or points to an address in the program RAM at which a patch program is stored when a patch is to be performed at the particular jump instruction.

Initially, patch programs, which may include one or more patch instructions, are stored in the external memory 7 and are loaded into the program RAM 50 preferably at the same time that the patch vector table is loaded into the data RAM 65. Thereafter, as the slave processor 30 executes the program instructions stored in program ROM 45, the slave processor 30 is directed, at each of the jump instructions, to jump to a location specified by the patch vector associated with that jump instruction. As indicated above, when no patch is to be performed at a jump, the patch vector for that jump specifies another address within the program ROM 45 and the processor 30 jumps directly to that address (which may be the next address, a subroutine or any other address within the program ROM 45) to continue execution of the code stored in the program ROM 45. However, when a patch is to be performed at a jump instruction, the patch vector for that jump instruction is an address (or some other value that points to an address) in the program RAM 50 where the appropriate patch program is stored. Upon reaching such a jump instruction, the processor 30 jumps to the patch program in the program RAM 50 and executes the patch program. The patch program includes a jump instruction at the end thereof which causes the processor 30 to jump back to any desired address within the program ROM 45. This return address may be the next address within the program ROM 45 (following the jump instruction that caused the patch program to be executed) when, for example, the patch program provides some enhanced function. Alternatively, the return address may be an address elsewhere within the program ROM 45 causing one or more of the original ROM program instructions to be skipped when, for example, some of the code within the program ROM 45 needs to be replaced by the patch program.

Figure 2:
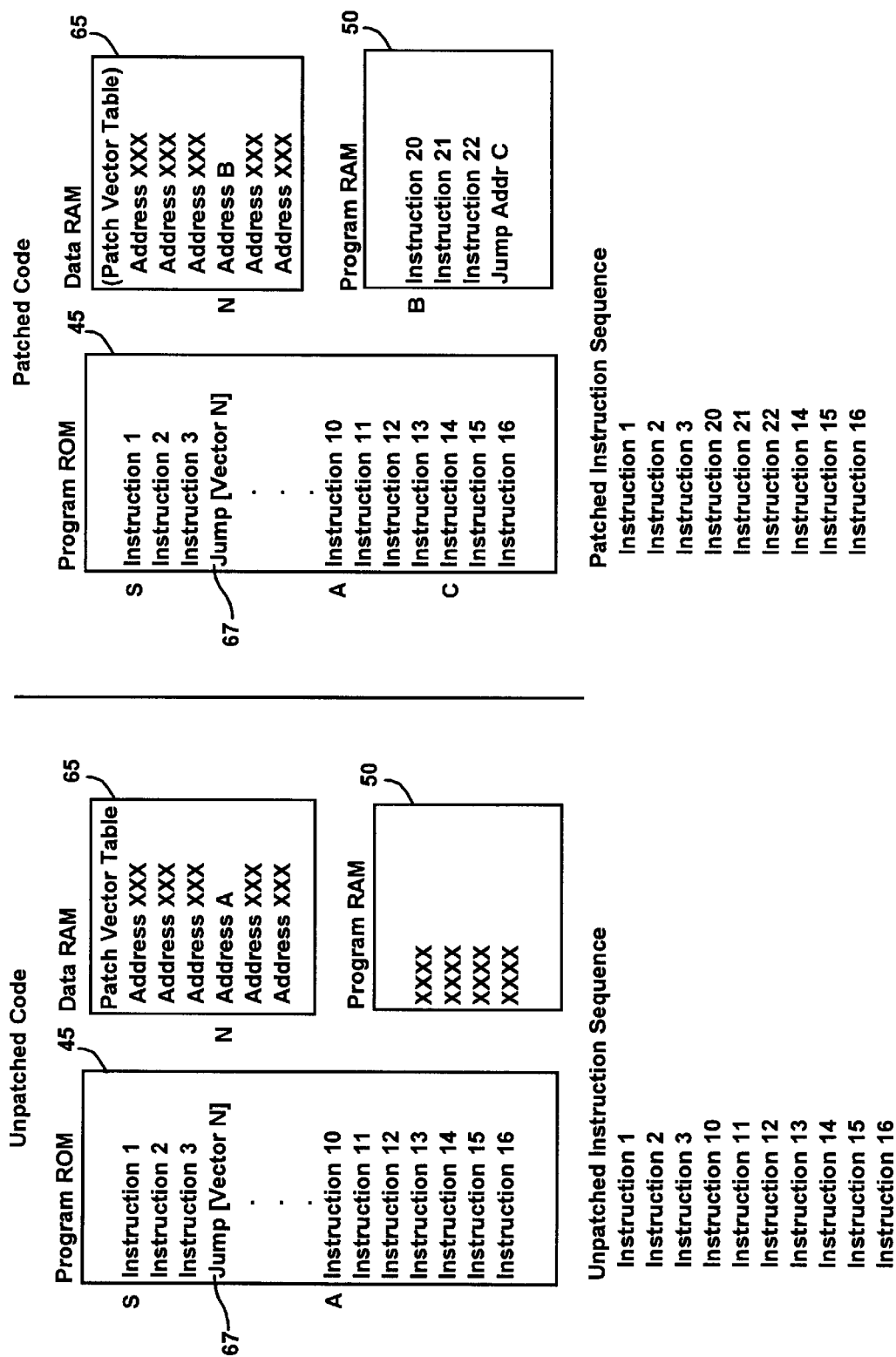
FIG. 2 is a memory map for a program ROM, a program RAM and a data RAM of FIG. 1, illustrating a method of patching ROM code using a patch vector table.

An example of this patch mechanism will be described with respect to FIG. 2, which illustrates the relevant contents of the program ROM 45, the program RAM 50 and the data RAM 65 for a section of ROM code that is unpatched and for that same section of ROM code when that code has been patch with a patch program. As illustrated on the left side of FIG. 2, unpatched code instructions 1–3 and 10–16 and a jump instruction 67 are stored in the program ROM 45. The jump instruction 67 refers to or points to a patch vector (which is an address or other pointer) stored at an address N within, for example, the data RAM 65. The patch vector at the address N is one entry of a patch vector table stored in the data RAM 65, this patch vector table including an entry for each jump instruction within the program ROM 45. In the example of FIG. 2, the patch vector at the address N associated with the jump instruction 67 is the address A. The patch vectors within the patch vector table for jump instructions not shown in the program ROM 45 of FIG. 2 are illustrated as "Address XXX". Because the patch vector at address N points back to address A within the program ROM 45, no patch program is to be executed at the jump instruction 67. As a result, no patch program is stored in the program RAM 50.

During operation, the slave processor 30 starts execution of the code within the program ROM 45 at the address S (for "start"), executes the instructions 1–3 and then reaches the jump instruction 67. The processor 30 retrieves the contents of the patch vector at the address N, as directed by the jump instruction 67, and jumps to the location specified by the patch vector at the address N, namely, the address A. As a result, no patch program is performed and the unpatched instruction sequence for the program code in the program ROM 45 is instructions 1–3 and then instructions 10–16.

Referring now to the right side of FIG. 2, the patch vector table has been configured to run a patch program at the jump instruction 67. In particular, the patch vector at the address N within the patch vector table has been changed to address B, which is an address within the program RAM 50. Likewise, a patch program having instructions 20–22 and a jump to address C of the program ROM 45 is stored at the address B of the program RAM 50. Now, when run, the processor 30 executes instruction 1–3 in the program ROM 45 and, when it reaches the jump instruction 67, the processor 30 jumps to the address specified by the patch vector at the address N of the data RAM 65, namely address B. The processor 30 then executes the patch program instructions 20–22 starting at address B within the program RAM 50 and then jumps to the address C within the program ROM 45, as directed by the jump instruction immediately following the instruction 22. As will be understood, the patched instruction sequence is ROM instructions 1–3, patch program instructions 20–22 and ROM instructions 14–16.

It will be understood that the patch vector table may initially be stored in the data ROM 60 having default patch vectors to be used when no patching is needed, such default patch vectors assuring that the code within the program ROM 45 is implemented in a desired order. The default patch vector table may be transferred to the data RAM 65 upon power-up or at some other convenient time. When patching is to be used, a new or updated patch vector table may be loaded from, for example, the external memory 7, into the data RAM 65 and the updated patch vector table may cause one or more patch programs (which are loaded into the program RAM 50) to be executed at the appropriate time. However, if desired, the patch vector table may be stored in the external memory 7 and may be accessed by the processor 30 without storing the patch vector table in the data RAM 65. Also, if desired, the patch vector table may be stored in the program RAM 50, although this uses up precious space within the program RAM 50. Furthermore, it will be understood that the jump instructions within the program ROM 45 may be direct jump commands, may be calls such as subroutine calls, or may be any other type of instruction that causes redirection of the program based on the contents of the patch vector table. Still further, it will be understood that the final instruction of each patch program may cause a jump to any desired address within the program ROM 45.

In the architecture illustrated in FIG. 1, program instructions or code can be run most efficiently from program ROM 45 or program RAM 50. As indicated above, however, it is desirable to make the program RAM 50 as small as possible. While useful, the embodiment described with respect to FIG. 2 requires that all of the instructions of each patch program be stored in the program RAM 50 at any time any one of the patches may be needed, which increases the size requirement of the program RAM 50 or, alternatively, decreases the number of or the size of the patch programs that can be executed. In a second embodiment, described with respect to FIG. 3, the program RAM 50 is set up to include a first section that stores a patch program stub for each patch program to be run and a RAM cache 70 which stores, on a temporary basis, the particular patch program currently being executed. The use of the configuration described with respect to FIG. 3 enables the main body of all of the patch programs to be stored elsewhere, such as in the data RAM 65 or in the external memory 7, until a particular patch program is to be actually performed, at which time this patch program is transferred to the RAM cache 70 and is executed.

Figure 3:
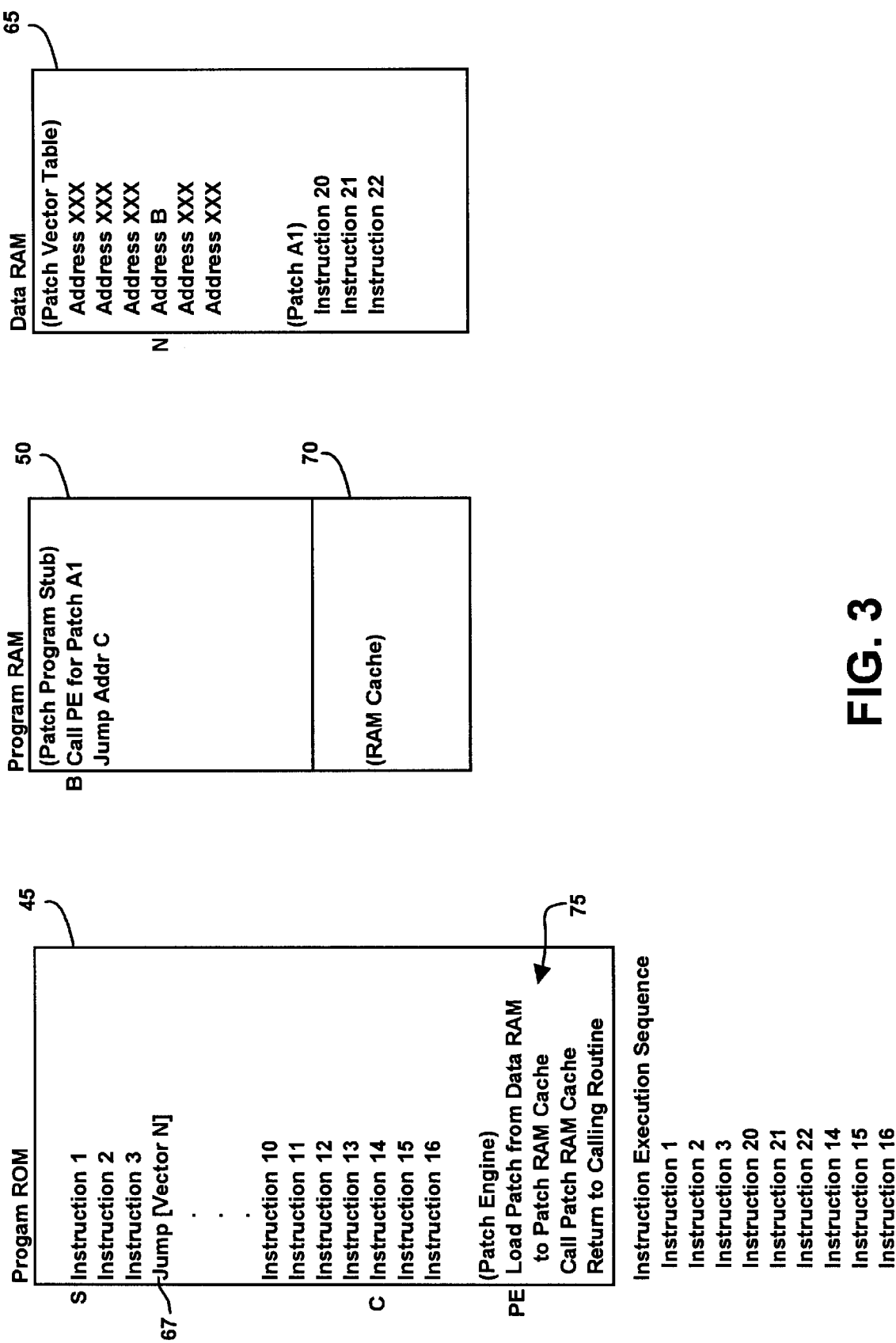
FIG. 3 is a memory map of the program ROM, the program RAM and the data RAM of FIG. 1, illustrating a method of patching ROM code using a patch engine and a RAM cache.

In this embodiment, each of the patch program stubs stored in the program RAM 50 (only one of which is illustrated in FIG. 3) includes a patch engine call that calls a patch engine 75 stored in, for example, the program ROM 45 or the program RAM 50. When called, the patch engine 75 loads the main body of a patch program into the RAM cache 70, runs the patch program in the RAM cache 70 and then returns to the program stub or, alternatively, to the program ROM 45. The use of a patch engine 75 allows the larger and more versatile external memory 7 to hold the main body of each of the patch programs, while the relatively scarce program RAM 50 resources are used to store patch stubs and to implement the one particular patch that is currently needed during operation of the processing device 5.

FIG. 3 illustrates the contents of the program ROM 45, the program RAM 50 and the data RAM 65 when the patching mechanism using a patch engine as described above is implemented. The program ROM 45 is the same as that of FIG. 2, except that the patch engine 75 is stored therein. The program RAM 50 is illustrated as including a patch program stub (located at the address B) having a patch engine call that specifies the patch program A1 and that calls the patch engine 75. The program stub also includes a jump instruction which causes a jump back to the address C of the program ROM 45. The data RAM 65 is the same as that of FIG. 2 except that the instructions 20–22 associated with the patch program A1 are stored therein.

Similar to the embodiment described in conjunction with FIG. 2, the slave processor 30 begins execution of the instructions in the program ROM 50 at the address S and executes the instructions 1–3 and the jump instruction 67. The jump instruction 67 causes the processor 30 to continue execution at the address specified by the patch vector at the address N of the patch vector table which, in this case, is the address B within the program RAM 50. The processor 30 jumps to the address B and begins execution of the patch program stub for the patch program A1. The processor 30 is directed by the patch call at the address B to call the patch engine 75 for the patch program A1. The patch engine call may specify which patch program is to be executed by the patch engine 75 in any desired manner, for example, by specifying an address in the data RAM 65 where the desired patch program is stored, by specifying a name or other identifier of the desired patch program which the patch engine 75 can use to locate the desired patch program, or based on an address associated with the patch engine call as described in more detail below. Furthermore, while the patch engine call is preferably a single instruction, it may include two or more instructions if necessary to specify a particular patch program to be executed and to call the patch engine 75.

In any event, the patch engine 75, upon being called, loads the specified patch program (here the patch program A1) into the RAM cache 70 and calls or jumps to the patch program within the RAM cache 70 to thereby cause execution of that patch program. After the instructions associated with the patch program A1 are stored in the RAM cache 70 and are executed, the patch engine 75 returns to its calling routine which, in this example, is the patch program stub at the address B. The next instruction within the patch program stub is a jump instruction which causes the processor 30 to jump to the address C within the program ROM 45, which completes the patch. Thus, while the processor 30 executes the same sequence of instructions as the embodiment described with respect to FIG. 2 (i.e., instructions 1–3, 20–22 and 14–16), the main portion of the patch program instructions for each patch program are loaded into the RAM cache 70 only when actually being implemented. Therefore, instead of having all of the instructions for each patch program stored in the program RAM 50, only a patch stub having a patch engine call and a jump instruction needs to be stored in the program RAM 50 for each patch program while the main body of each of the patch programs can remain in the data RAM 65 until actually needed. This configuration considerably decreases the size requirements of the program RAM 50.

If desired, each patch program stored in the data RAM 65 and loaded into the cache 70 can have a jump instruction at the end thereof causing a direct jump back to a desired address within the program ROM 45. In this instance, the patch program stub can be a single patch engine call in the form of a jump instruction that specifies a patch program for execution and that causes a jump to the patch engine 75. Of course, the patch engine 75 loads the specified patch program into the RAM cache 70 and jumps to the beginning of that program instead of calling that program as a subroutine. Then, when the patch program is completed, the jump at the end of the patch program causes a direct jump back to the program ROM 45 thereby completing the patch. Of course, other variations in the manner in which a program stub causes the patch engine 75 to load and execute a patch program and then causes a return to a desired address within the program ROM 45 can be used as well.

It will be understood that any number of patch program stubs can be stored in the program RAM 50 to specify and cause the execution of any number of patch programs. Also, any particular patch program stub may include other instructions, in addition to a patch engine call and a return jump. If desired, one or more of the patch program stubs stored in the program RAM 50 may be of the type illustrated in FIG. 3 (including a patch engine call), while others of the patch program stubs stored in the program RAM 50 may include entire patch programs without a patch engine call. Furthermore, while the patch programs and the patch vector table have been described as being stored in the data RAM 65, these elements could just as well be stored in and accessed from the external memory 7 without being stored in the data RAM 65. This will reduce the amount of space required in the data RAM 65 and, if the patch programs are stored in and accessed directly from the external memory 7, it will also decrease the size requirement of the data RAM 65.

In another embodiment, efficiency may be further enhanced through the use of a patch engine data table that includes data pertaining to each patch program stored in the data RAM 65. Such a patch engine data table is used by the patch engine 75, in conjunction with a stack, to find, load and execute a patch program and then to return to the patch program stub which called the patch engine or directly to the program ROM 45. In general, a patch engine call automatically causes a return address to be placed on a stack associated with the processor 30.

The patch engine 75 uses that return address to identify a patch program to be executed for that patch engine call and, in particular, pops the return address off of the stack and compares that return address to a number of patch program identifiers stored in a patch engine data table to thereby identify which patch program is to be loaded and executed for that patch engine call. When the patch engine 75 finds a match for the return address within the patch engine data table, the patch engine 75 reads information associated with the matching patch program identifier to enable the patch engine 75 to locate, load and execute the appropriate patch program. This data may take the from of a patch program address indication specifying the location or address of the patch program to be run, a length indication indicating the number of instructions within the patch program to be run, and a return address specifying the address to which the processor 30 should return when it has completed execution of the patch program. Of course, other information may be provided in the alternative or in addition to that described herein. The patch engine data table may be stored at any desired location including, for example, within the data RAM 65, the program RAM 50, or the ROM 10 or RAM 15 of the external memory 7.

Figure 4:
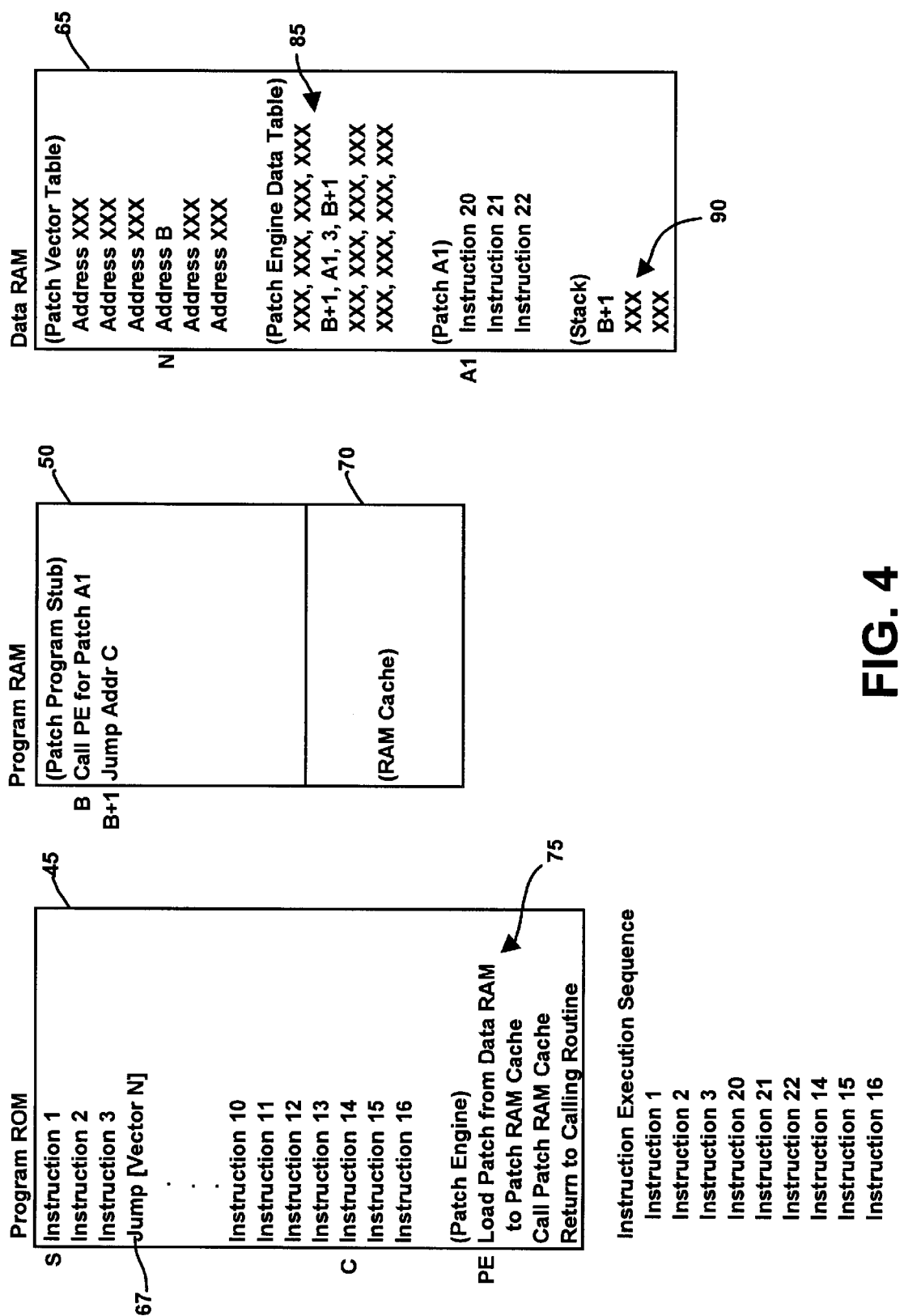
FIG. 4 is a memory map of the program ROM, the program RAM and the data RAM of FIG. 1, illustrating a method of patching ROM code using a patch engine and a patch engine data table.

FIG. 4 illustrates a memory configuration of a patching mechanism that uses a patch engine and a patch engine data table to locate and execute a patch program. The configuration of the program ROM 45 and the program RAM 50 of FIG. 4 is identical to that of FIG. 3. Similar to FIG. 3, the data RAM 65 includes the patch program Al and a patch vector table. However, the patch vector table includes, in addition to the set of patch vectors, a patch engine data table 85 having a series of entries, each of which is illustrated in FIG. 4 as a row of data. In the embodiment of FIG. 4, each of the entries within the patch engine data table 85 includes a patch program identifier (first column), a patch program address indication (second column), a patch program length indication (third column) and a return address (fourth column). Furthermore, a stack 90 is illustrated as being located in the data RAM 65 of FIG. 4, although this stack could instead be located elsewhere within the processing device 5.

Just as in the embodiment described with respect to FIG. 3, the processor 30 begins execution at the address S in the program ROM 45, where instructions 1–3 are executed. After instruction 3 is executed, the jump instruction 67 directs program flow to the contents of address B in the program RAM 50. The first instruction of the patch program stub at address B is a patch engine call that calls the patch engine 75 in program ROM 45. At this point, the return address for the patch engine call, namely address B+1, is automatically pushed onto the stack 90. The processor 30 then begins execution of the patch engine 75 which pops the address B+1 off of the stack 90 and compares that address to one or more of the patch program identifiers within the patch engine data table 85. When a match is found, the patch engine 75 uses the address indication at the specified entry in the patch engine data table (e.g., Al in FIG. 4) to locate the address at which the patch program to be executed is stored. The patch engine 75 uses the length indication for the specified entry to determine the length of the patch program to be loaded into the RAM cache 70 and places the return address of the specified entry onto the top of the stack 90. In FIG. 4, the address indication for the program identifier "B+1" is address A1, indicating that the specified patch program is stored at address A1. Likewise, the length indication for the program identifier "B+1" is "3", indicating that the patch program stating at the address A1 is three instructions long. In the configuration of FIG. 4, the patch engine 75 loads the three instructions of the patch program starting at the address Al into the RAM cache 70 and executes that patch program. Thereafter, when the patch engine returns to the calling routine, the processor 30 pops the address off the top of the stack (which is the return address specified by the patch engine data table) and returns to that address. If desired, the return address may simply be the address used to identify the specified patch program in the first place, namely B+1 in the example of FIG. 4. If this is the case, the instruction at the address B+1 (which is a jump to a desired address in the program ROM 45) is executed. However, if desired, the return address within the patch engine data table 85 may be an address within the program ROM 45 (such as the address C) causing the patch engine 75 to return directly to the address C within the program ROM 45 without returning to the patch program stub. This technique eliminates the need to return to various places in the code that merely direct code execution flow which, in turn, reduces the execution time of the patch program.

In an alternate embodiment, the patch engine 75 may be called directly by a jump instruction (e.g., jump instruction 67) within the program ROM 45 without the use of the patch vectors within the patch vector table or the need for patch engine calls within the program RAM 50. In this embodiment, the patch engine 75 uses the contents of the top of the stack 90 (specifying the jump instruction which called the patch engine 75) and the patch engine data table 85 to locate a specified patch program for execution, in the manner described above. Of course, in this configuration, the return address for the patch program entry will specify an address within the program ROM 45. During operation of this configuration, the jump instruction 67 calls or otherwise jumps directly to the patch engine 75. The patch engine 75 then uses the address on the stack 90 and the patch engine data table 85 to identify and locate the patch program to be executed. If no patch program is to be executed, the patch program address or length indication may be a unique code that tells the patch engine 75 to simply return to the program ROM at the return address specified by the patch engine data table 85. If a patch is to be performed, however, the patch engine 75 finds, loads and executes the specified patch program based on the information within the patch engine data table 85 and then returns to the address within the program ROM 45 indicated by the return address of the patch engine data table 85. As noted above, this configuration further reduces the amount of space needed in the program RAM 50 as it eliminates the need to provide patch program stubs or patch engine calls within the program RAM 50. Likewise, this configuration streamlines execution of a patch program.

While the patching methods described herein are described with respect to a particular processing device configuration, it will be understood that these methods can be used in other types of processing devices, in processing devices that use other hardware configurations and in processing devices that use any other types of ROMs, RAMs, etc. to implement code. Also, it will be noted that, when the external ROM 10 of the external memory 7 is used to store patch programs and/or patch vector tables, this memory may be a reprogrammable memory, such an erasable ROM which can be reprogrammed whenever a new patch program or set of patch programs is provided for the program ROM 45. Alternatively, however, the external ROM 10 can be a non-erasable memory that is replaced whenever a new set of patch programs is provided for the program ROM 45.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

It is claimed:

1. A processing device comprising:
a program read only memory (ROM) having program instructions and a jump instruction;
a patch program;
a program random access memory (RAM) capable of storing the patch program for execution;
a data memory;
a patch vector table stored in the data memory including a patch vector that indicates the location of the patch program;
a processor that executes the program instructions in the program ROM and that uses the patch vector table when it reaches the jump instruction to execute the patch program; and
a patch engine, wherein the patch program includes a first portion stored in the program RAM and a second portion stored in a further memory, wherein the first portion includes a patch engine call that calls the patch engine, the second portion includes one or more patch instructions and wherein the patch engine, when called, locates the second portion of the patch program in the further memory, loads the second portion of the patch program into the program RAM and runs the second portion of the patch program.

2. The processing device of claim 1, wherein the further memory is the data memory.

3. The processing device of claim 1, wherein the first portion of the patch program includes an indication that indicates the location of the second portion of the patch program in the further memory and the patch engine uses the indication to locate the second portion of the patch program.

4. The processing device of claim 1, wherein the patch engine is stored in the program ROM.

5. The processing device of claim 1, wherein the patch engine is stored in the program RAM.

6. The processing device of claim 1, further including a patch engine data table having data pertaining to the second portion of the patch program, wherein the patch engine uses the patch engine data table to locate the second portion of the patch program.

7. The processing device of claim 6, wherein the patch engine data table has an indication that indicates the location of the second portion of the patch program in the further memory and wherein the patch engine uses the indication to locate the second portion of the patch program.

8. The processing device of claim 6, wherein the patch engine data table includes a patch program identifier that identifies the second portion of the patch program and an address indication that indicates an address in the further memory where the second portion of the patch program is located.

9. The processing device of claim 8, wherein the patch program identifier is indicative of an address associated with the location of the first portion of the patch program within the program RAM.

10. The processing device of claim 8, wherein the patch engine data table further includes a length indication indicating the number of patch instructions within the second portion of the patch program.

11. The processing device of claim 8, wherein the patch engine data table further includes a return address to be used when the second portion of the patch program has been executed.

12. The processing device of claim 8, wherein the patch program identifier is indicative of an address within the program RAM, wherein the patch engine data table includes a number of entries and one of the entries includes the patch program identifier, the address indication and a return address and wherein the patch engine compares an actual address associated with the first portion of the patch program in the RAM with the patch program identifier to locate a desired entry in the patch engine data table, uses the address indication at the desired entry to locate the second portion of the patch program in the further memory and uses the return address to cause a return to the first portion of the patch program within the program RAM or to the program instructions within the program ROM.

13. The processing device of claim 8, wherein the patch engine data table is stored in the further memory.

14. The processing device of claim 1, wherein the patch program is stored in the program RAM and the patch vector points to an address in the program RAM at which the patch program is stored.

15. The processing device of claim 1, wherein the patch program is stored in the program ROM and the patch vector points to an address in the program ROM at which the patch program is stored.

16. A processing device comprising:
a program read only memory (ROM) having program instructions and a jump instruction;
a patch program;
a program random access memory (RAM) capable of storing the patch program for execution;
a data memory;
a patch vector table stored in the data memory including a patch vector that indicates the location of the patch program;
a processor that executes the program instructions in the program ROM and that uses the patch vector table when it reaches the jump instruction to execute the patch program; and
a further memory and a patch engine, wherein the patch program is stored in the further memory, the patch vector table includes a patch engine data table having an indication that indicates the location of the patch program within the further memory, wherein the jump instruction calls the patch engine and wherein the patch engine, when called, uses the patch engine data table to locate the patch program, loads the patch program into the program RAM and runs the patch program.

17. The processing device of claim 16, wherein the processor, the program ROM and the program RAM are located within a single integrated circuit and the further memory is located off of the integrated circuit.

18. The processing device of claim 16, wherein the further memory is the data memory.

19. The processing device of claim 16, wherein the jump instruction causes a direct jump to the patch engine.

20. A processing device, comprising:
a read only memory (ROM) having program instructions and a plurality of jump instructions;
a set of patch programs;
a random access memory (RAM) having a first section and a cache adapted to store one of the set of patch programs for execution;
a patch engine which, when called, retrieves a specified patch program, loads the specified patch program into the cache and causes execution of the specified patch program;

one or more patch engine calls stored in the first section of the RAM, wherein each of the patch engine calls specifies one of the set of patch programs as the specified patch program and calls the patch engine; and a processor that executes the program instructions in the ROM and, upon reaching one of the plurality of jump instructions, jumps to one of the patch engine calls within the first section of the RAM.

21. The processing device of claim 20, further including a patch vector table having a patch vector for each one of the plurality of jump instructions, wherein each of the patch vectors points to a ROM address within the ROM or to a RAM address within the first section of the RAM, and wherein the processor uses the patch vector table to perform a jump when it reaches any one of the plurality of jump instructions.

22. The processing device of claim 21, wherein the patch vector table is stored in a further memory.

23. The processing device of claim 21, further including a patch engine data table having data pertaining to the implementation of each of the set of patch programs, wherein the patch engine uses the patch engine data table to load the specified patch program into the RAM cache.

24. The processing device of claim 23, wherein the patch engine data table includes a patch program identifier for each of the set of patch programs and an address indication associated with each of the patch program identifiers indicating an address where the patch program identified by the patch program identifier is stored.

25. The processing device of claim 24, wherein the patch program identifier is indicative of a RAM address associated with one of the patch engine calls.

26. The processing device of claim 24, wherein the patch engine data table further includes a return address associated with each of the patch program identifiers to be used when the patch program identified by the patch program identifier has been executed.

27. The processing device of claim 24, wherein each of the patch program identifiers is indicative of an address within the RAM associated with one of the patch engine calls, wherein the patch engine data table includes a number of entries, each entry having one of the patch program identifiers, one of the address indications and a return address and wherein the patch engine compares an actual address associated with the RAM to one or more of the patch program identifiers to locate a desired entry for the specified patch program, uses the address indication at the desired entry to locate the specified patch program and uses the return address at the desired entry to cause a return to the RAM or to the ROM.

28. The processing device of claim 20, wherein an actual address associated with each of the patch engine calls specifies one of the set of patch programs as the specified patch program.

29. The processing device of claim 20, wherein the patch programs are stored in the ROM.

30. The processing device of claim 20, wherein the patch programs are stored in the RAM.

31. The processing device of claim 20, wherein the patch programs are stored in a further memory.

32. A processing device, comprising:

a read only memory (ROM) having program instructions and a plurality of jump instructions;

a set of patch programs;

a random access memory (RAM) adapted to store one of the set of patch programs for execution;

a patch engine which, when called, retrieves a specified patch program, loads the specified patch program into the RAM and causes execution the specified patch program;

a patch engine data table having data pertaining to the implementation of each of the set of patch programs, wherein the patch engine uses the patch engine data table to load the specified patch program into the RAM; and a processor that executes the program instructions in the ROM and, upon reaching one of the plurality of jump instructions, implements the patch engine to execute the specified patch program.

33. The processing device of claim 32, wherein the RAM includes a first section having a patch engine call and includes a cache adapted to store the one of the set of patch programs for execution and wherein the one of the plurality of jump instructions causes a jump to the patch engine call in the first section of the RAM.

34. The processing device of claim 33, wherein the patch engine call specifies a particular one of the set of patch programs as the specified patch program.

35. The processing device of claim 33, wherein an actual address associated with the patch engine call specifies a particular one of the set of patch programs as the specified patch program.

36. The processing device of claim 32, wherein the one of the plurality of jump instructions causes a direct jump to the patch engine and wherein the patch engine uses the patch engine data table to identify which one of the set of patch programs is the specified patch program.

37. The processing device of claim 32, wherein the patch engine data table includes a patch program identifier for each of the patch programs and an address indication associated with each of the patch program identifiers indicating an address where the patch program identified by the patch program identifier is located.

38. The processing device of claim 37, wherein the patch engine data table further includes a return address associated with each of the patch program identifiers.

39. The processing device of claim 37, wherein each of the patch program identifiers is indicative of an address within the ROM, wherein the patch engine data table includes a number of entries, each entry including one of the patch program identifiers, one of the address indications and a return address and wherein the patch engine compares an actual address associated with the ROM to one or more of the patch program identifiers to locate a desired entry for the specified patch program, uses the address indication at the desired entry to locate the specified patch program and uses the return address at the desired entry to cause a return to the ROM.

40. The processing device of claim 32, wherein the patch programs are stored in the ROM.

41. The processing device of claim 32, wherein the patch programs are stored in the RAM.

42. The processing device of claim 32, wherein the patch programs are stored in a further memory.

* * * * *